United States Patent [19]

Sakai

[11] Patent Number: 4,852,049
[45] Date of Patent: Jul. 25, 1989

[54] VECTOR MASK OPERATION CONTROL UNIT

[75] Inventor: Noriaki Sakai, Tokyo, Japan

[73] Assignee: NEC Corporation, Tokyo, Japan

[21] Appl. No.: 891,574

[22] Filed: Jul. 30, 1986

[30] Foreign Application Priority Data

Jul. 31, 1985 [JP] Japan .................................. 60-167447

[51] Int. Cl.[4] .............................................. G06F 9/34
[52] U.S. Cl. ...................................................... 364/200
[58] Field of Search ... 364/200 MS File, 900 MS File

[56] References Cited

U.S. PATENT DOCUMENTS

4,179,737 12/1979 Kim ...................................... 364/200
4,680,730 7/1987 Omoda et al. ................... 364/200 X

*Primary Examiner*—David L. Clark
*Attorney, Agent, or Firm*—Foley & Lardner, Schwartz, Jeffery, Schwaab, Mack, Blumenthal & Evans

[57] ABSTRACT

A vector mask control unit and method of operating same prevents the unnecessary reading or arithmetic operation of operands corresponding to mask inhibitory bits by generating a total address increment value based on the number of consecutive operation-inhibitory bits counted by a counter, the total address increment value being composed of at least one increment value that is multiplied by a power of two. The total address increment value is added to a vector address to obtain an operand address. As a result, the efficient procession of masked vector instructions can be easily achieved.

5 Claims, 6 Drawing Sheets

VECTOR MASK OPERATION CONTROL UNIT

BACKGROUND OF THE INVENTION

The present invention relates to a vector mask operation control unit for use in a data processing system to execute masked vector instruction processing.

For a conventional data processing system of this kind, reference may be made to the specification of U.S. patent application No. 544,674/1983 (corresponding to the Japanese Patent Disclosure No. 103482/1985) filed on July 20, 1984 by International Business Machines Corporation. The system disclosed by this patent has a central processing unit and a vector processing unit. In this system, mask bits merely control setting into the vector register and restraint on storage into the main memory, but do not control the reading operation for unrequired operand data or inhibition of arithmetic operations. To control this reading operation for the unrequired operand data and the inhibition of arithmetic operations, this system has to multiply, at the time of address generation of operand data, the number of elements (N) whose arithmetic, loading or storing operations are inhibited by the address of the distance between vector elements ($V_I$), that is, the vector-address-increment (VAI) value, and thereby to generate an operand address increment ($NXV_I$) A multiplier to be used for this multiplication, however, requires a considerable amount of hardware.

SUMMARY OF THE INVENTION

An object of the present invention is, therefore, to provide a vector mask operation control unit capable of reducing the time required for the processing of operand addresses for vector masking without increasing the volume of hardware.

According to an aspect of the invention, there is provided a vector mask operation control unit for use in a data processing system to execute the processing of masked vector instructions decoded by instruction control unit. The control unit comprises a counting means for counting the number of consecutive operation-inhibitory bits in a plurality of bits each masking one of plural vector operands given on the basis of the instructions. Also included are means for generating one or two address increment values multiplied by a power of 2 by the use of a value or values counted by the counter means the unit is further provided with address generating means for obtaining operand addresses by adding the address increment values multiplied by a power of 2 and a vector address.

BRIEF DESCRIPTION OF THE DRAWINGS

Other features and advantages of the invention will become more apparent from the following detailed description when taken in conjunction with the accompanying drawing in which.

In the drawings, the same reference numerals represent respectively the same structural elements.

DETAILED DESCRIPTION OF THE PREFERRED EMBODIMENT

Figures 1, 2:
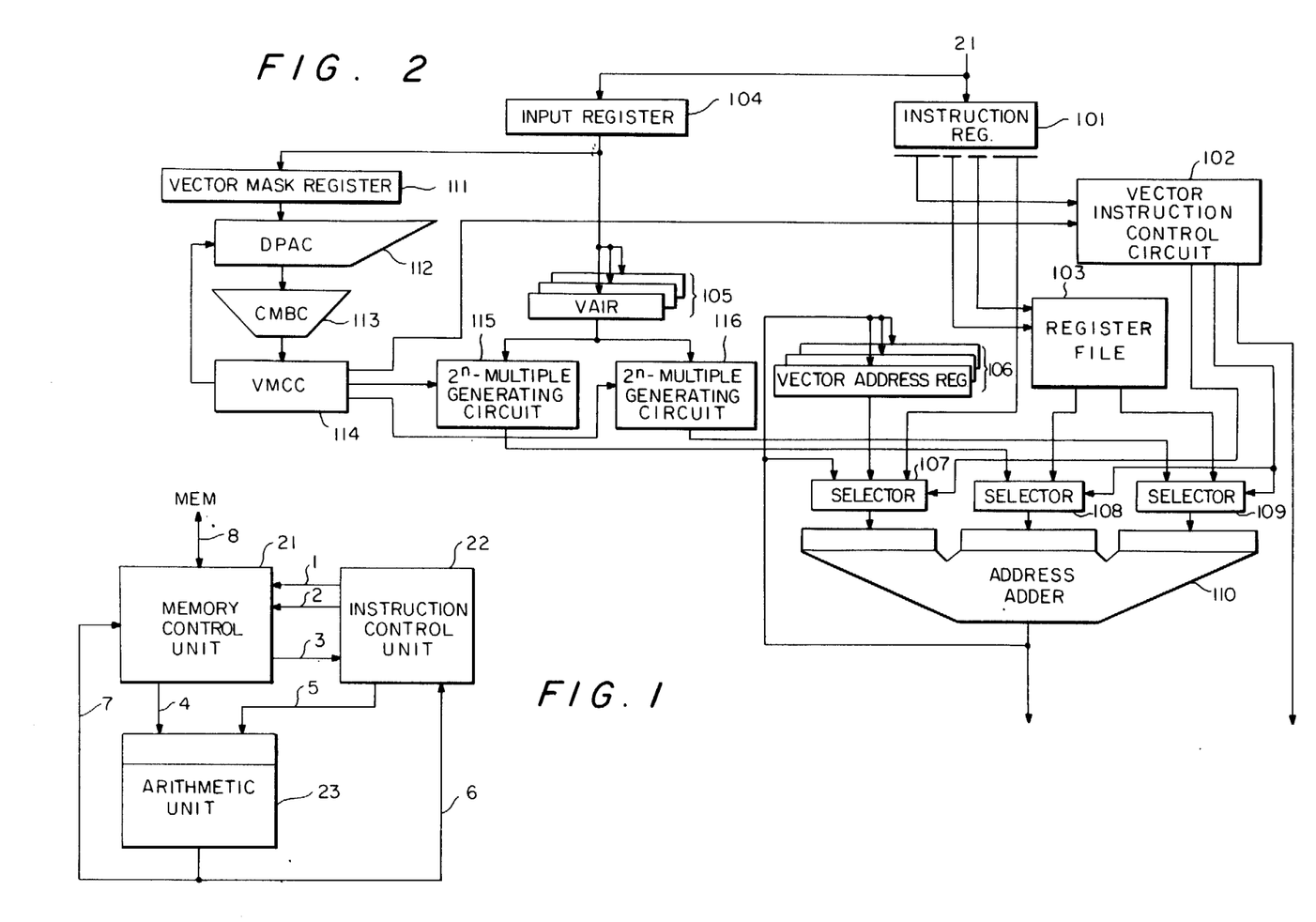
FIG. 1 is a diagram of a central processing unit to which the present invention is applicable.
FIG. 2 is a diagram of one preferred embodiment of the invention.

Referring to FIG. 1, a central processing unit comprises an instruction control unit 22, a memory control unit 21 and an arithmetic unit 23. Since the arithmetic unit 23 is provided with an input buffer, the instruction control unit 23 can read out operands unsynchronously with the arithmetic operation. In the operand reading process, the instruction control unit 22 sends an operand address and an access request the memory control unit 21 via signal lines 1 and 2. In response to the operand address and access request from the instruction control unit 22, the memory control unit 21 reads the operand out of either a buffer memory or a main memory, and supplies it to the instruction control unit 22 and arithmetic unit 23 via signal lines 3 and 4. The instruction control unit 22 sends a decoded instruction or the like to the arithmetic unit 23 via a signal line 5. The result of the arithmetic operation indicated by the decoded information is supplied from the arithmetic unit 23 to the instruction control unit 22 and memory control unit 21 via signal lines 6 and 7, and the contents of a general-purpose register for address calculation and memory unit are updated.

The present invention will prove especially useful where instruction words decoded by the instruction control unit 22 are a masked vector instruction.

Although processing of vector operands can be executed either by the arithmetic unit 23 or a specially designed processor for vector processing, disclosed in the U.S. Pat. No. 4,128,880, no details in this regard will be given here because they are not directly relevant to the essentials of the present invention.

FIG. 2 illustrates the structure of the address calculator of an instruction control unit capable of processing masked vector instructions.

Referring to FIG. 2, one embodiment of the invention comprises an instruction register 101, a vector-instruction-control circuit 102, a general-purpose register file 103, an input register 104, a vector-address-increment register (VAIR) 105, a vector address register 106, a selector A 107, a selector B 108, a selector C 109, an address adder 110, a vector mask register 111, a digit-position-aligning circuit (DPAC) 112, a consecutive-mask-bit counter (CMBC) 113, a vector-mask-control circuit (VMCC) 114, and $2^n$-multiple-generating circuits A 115 and B 116. The instruction control unit 22 stores in the vector address register 106 the 0th element address ($V_H$) of each vector operand obtained by direct or indirect addressing, and at the same time stores the VAI value ($V_I$) of each vector operand in the VAIR 105. This operation applies to the first vector operand, second vector operand and third operand of a vector instruction, except that, where the vector instruction does not require both or either of the second and third vector operands, it applies only to the vector operand or operands needed for execution of the instruction. The present embodiment assumes a set of instructions wherein both the 0th element address ($V_H$) of each vector operand and the VAI value ($V_I$) of each vector operand are indicated in the instruction words.

Referring now to both FIGS. 1 and 2, address calculation information in the instruction words read out of the memory control unit 21 is set in the instruction register 101. On the basis of this address calculation information, an index and base value are read out of the general-purpose register 103. An address generated in the address adder 110 on the basis of these index and base value together with a displacement directly designated in the instruction words is set in the vector address register 106. At this time, though an address is generated, no memory access request is output. Simultaneously, the VAI value ($V_I$) of the vector operand in the instruction words is set in the input register 104, and transferred to the VAIR 105 corresponding to the vector address register 106. This operation is repeated as many times as the number of vector operands, and the 0th element address ($V_H$) of each vector operand and the VAI value ($V_I$) of each vector operation are all set in the vector address register 106 and VAIR 105. A mask word from either a memory unit (not shown) or the memory control unit 21 is also set, on the basis of the address calculation information in the instruction words, in the vector mask register 111 via the input register 104. In this particular embodiment, it is supposed that, when the mask word is "0", the operation is inhibited. The mask word set in the vector mask register 111 passes the DPAC 112 and is entered into the CMBC 113. The DPAC 112 varies the number of digit positions to be aligned under the control of the VMCC 114.

Figure 3:
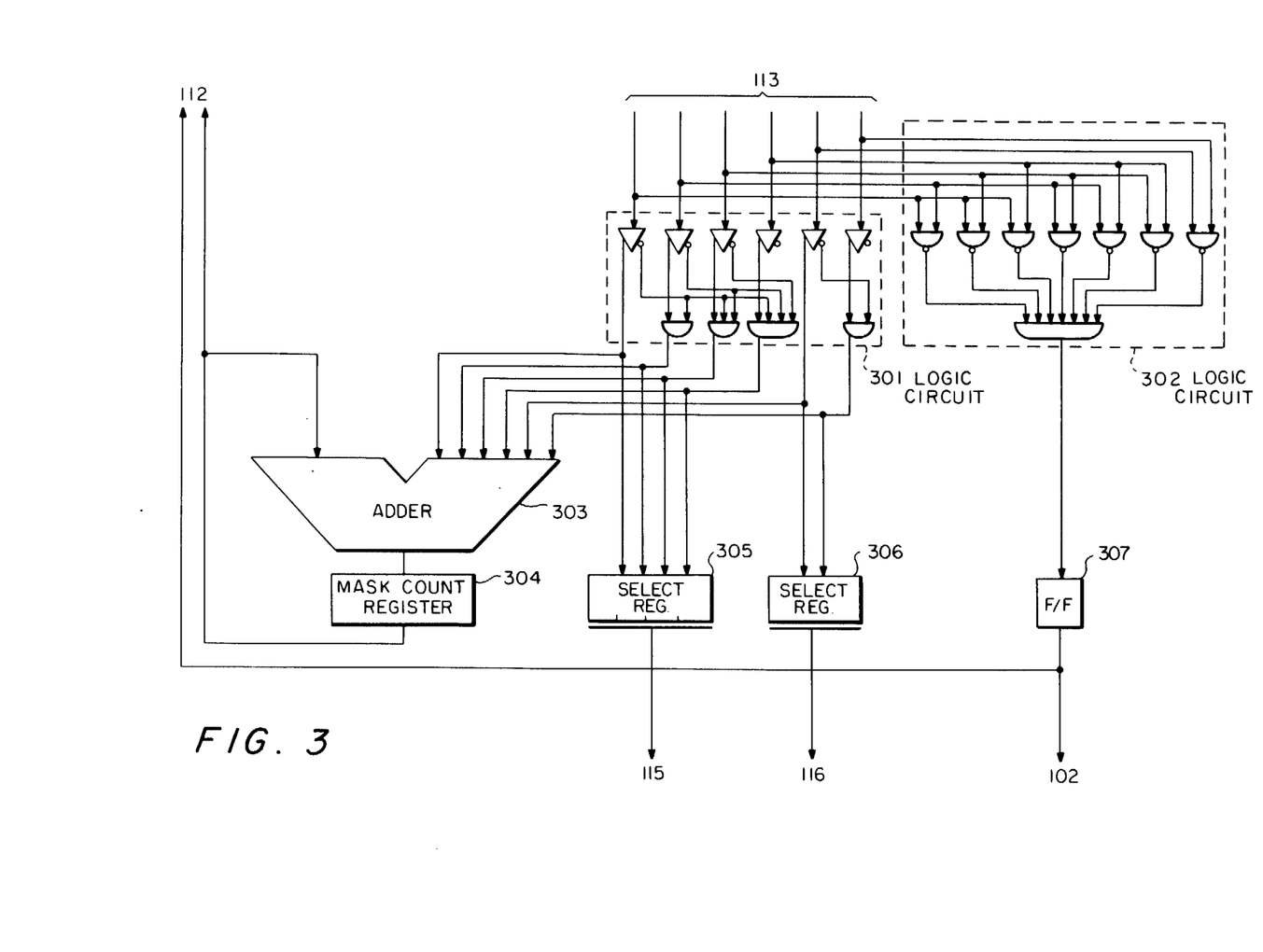
FIG. 3 is a diagram of one example of the structure of a vector mask control circuit 114 shown in FIG. 1.

Referring to FIG. 3, the VMCC 114, which controls the number of digit positions to be aligned, causes the DPAC 112 shown in FIG. 1 to shift to the left by the value given by a mask count register 304 to achieve digit-position alignment. The DPAC 112 has a built-in circuit (not shown) which coercively replaces the most significant bit (MSB) of the output with "0" except when the counts of the register 304 and a completion-flag flip-flop (F/F) 307 are all "0". The built-in circuit is intended to meet the following requirements. First there is supposed a case in which the mask is, for instance, "11010". As mask processing is started, the CMBC 113 outputs "0" because the DPAC 112 is shifted to the left by 0 bit. As a result, "0" is stored in the mask count register 304, a select register 305 and a select register 307. "1" is set in the completion flag F/F 307. As a result, the address adder 110 shown in FIG. 1 conducts an address calculation of $V_H+0V_I+0V_I=V_H$, accessing at the 0th element address ($V_H$) of the vector operand. As a result, in the next address calculation too, "0" is set in the register 304 illustrated in FIG. 3, and the DPAC 112 is shifted to the left by 0 bit, resulting in repetition of the same operation as the previous. To prevent this repetition, mask bits corresponding to already processed elements have to be reset. Thus the 0th bit of the output of the digit position aligning circuit 112, or the leftmost bit, is coercively replaced with "0". It must not be coercively replaced with "0" only when the 0th bit of the mask vector register 111, or the left end, is to be processed. Therefore, only when the counts of the mask count register 304 and the content of the completion flag F/F 307 are all "0", namely only at the beginning, an operation is performed to make effective the 0th bit, or the leftmost bit of the output of the DPAC 112.

At first, "0" is set in the register 304, and the very value of the vector mask register 111 is outputted from the DPAC 112. This output is given to the CMBC 113, which then outputs the number of consecutive mask bits. Thus the CMBC 113 outputs, as the number of elements on which operation is consecutively inhibited, the number of consecutive "0"s from the left in the number supplied from the vector mask register 111. Such a CMBC 113 is composed of a priority encoder. The number of consecutive mask bits provided in this manner being represent as N, the address of the vector operand element to be processed next is given by the formula of the 0th element address ($V_H$) of the vector operand + the number of consecutive mask bit (N) x the VAI value ($V_I$) of the vector operand. Here N can be represented by the sum of powers of 2. When N is "6" for instance, $6V_I=2^2V_I+2^1V_I$. Therefore, the value of $N \times V_I$ can be obtained by the use of $2^n$-multiple-generating circuits. In this embodiment, $2^n$-multiple-generating circuits A 115 and B 116, illustrated in FIG. 4, are used as examples of $2^n$-multiple-generating circuit.

Figure 4:
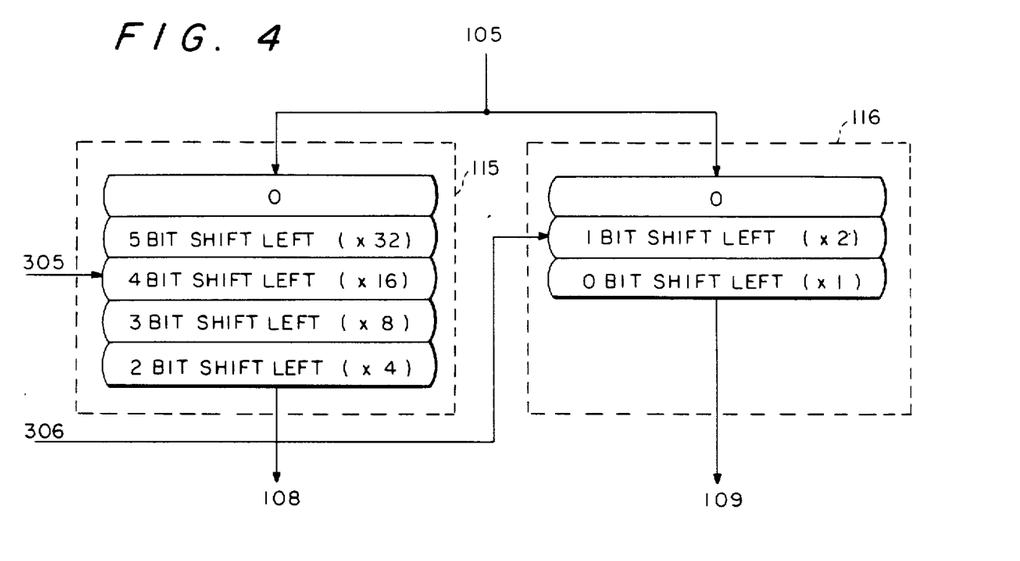
FIG. 4 is a diagram of one example of the structure of $2^n$-multiple-generating circuits A 115 and B 116 shown in FIG. 1.

Referring now to FIG. 4, the $2^n$-multiple-generating circuit A 115 can select one out of a shifter having a 2-bit shift left (x 4) function, a shifter having a 3-bit shift left (x 8) function, a shifter having a 4-bit shift left (x 16) function and a shifter having a 5-bit shift left (x 32) function, and outputs "0" when it selects none of them. The $2^n$-multiple-generating circuit B 116 can select either a shifter having a 1-bit shift left (x 2) function or a shifter having a 0-bit shift left (x 1) function, and outputs "0" when it selects neither of them. In this structure, however, it is impossible to simultaneously select the shifter having a 2-bit shift left (x 4) function and that having a 4-bit shift left (x 16) function, nor can it select the shifter having a 1-bit shift left (x 2) function and that having a 0-bit shift left (x 1) function. Therefore, by the use of a logic circuit 301 illustrated in FIG. 3, it is so arranged that, in the $2^n$-multiple-generating circuits A 115 and B 116, no combination prohibiting simultaneous selection may not occur either in the group of the shifter having a 2-bit shift left (x 4) function, that having a 3-bit shift left (x 8) function, that having a 4-bit shift left (x 16) function, that having a 5-bit shift left (x 32) function and the "0" output circuit or in the group of the shifter having a 1-bit shift left (x 2) function, that having a 0-bit shift left (x 1) function and the "0" output circuit.

Meanwhile, if there is essentially no combination prohibiting simultaneous selection, a logic circuit 302 shown in FIG. 3 is used to detect the absence of such a combination, and the completion-flag F/F 307 is set. When N is "27" for instance, $27V_I=2^4V_I+2^3V_I+2^1V_I+2^0V_I$. At this time, the combination of the shifter having a 4-bit shift left (x 16) function and that having a 3-bit shift left (x 8) function cannot be simultaneously selected by the $2^n$-multiple-generating circuit A 115. Nor can be selected at the same time the combination of the shifter having a 1-bit shift left (x 2) function and that having a 0-bit shift left (x 1) function by the $2^n$-multiple-generating circuit B 116. As the CMBC 112 outputs "27" or "011011" in a binary number, the logic circuit 301 outputs "18" or "010010" in a binary number so that neither the combination of the shifter having a 4-bit shift left (x 16) function and that having a 3-bit shift left (x 8) function nor the combination of the shifter having a 1-bit shift left (x 2) function and that having a 0-bit shift left (x 1) function may arise. The logic circuit 302 checks whether or not there is in the output of the CMBC 113 a combination prohibiting simultaneous shifter selection by either the circuit A 115 or B 116. In this instance, since neither the combination of the shifter having a 4-bit shift left (x 16) function and that having a 3-bit shift left (x 8) function nor the combination of the shifter having a 1-bit shift left (x 2) function and that having a 0-bit shift left (x 1) function can be simultaneously selected, "0" is selected and outputted.

Referring back to FIG. 3, the output of the logic circuit 301 and that of the mask count register 304 are added by an adder 303, and the result of addition is set in the register 304. In parallel with this addition, the output of the logic circuit 301 is stored in a select register A 305 and select register B 306. In this example, a binary number "0100" is stored in the select register A 305, and another binary number "10", in the select register B 306. Along with this storing operation the output of the logic circuit 302 sets the completion-flag F/F 307. In this instance, "0" is set in the F/F 307.

Figure 6:
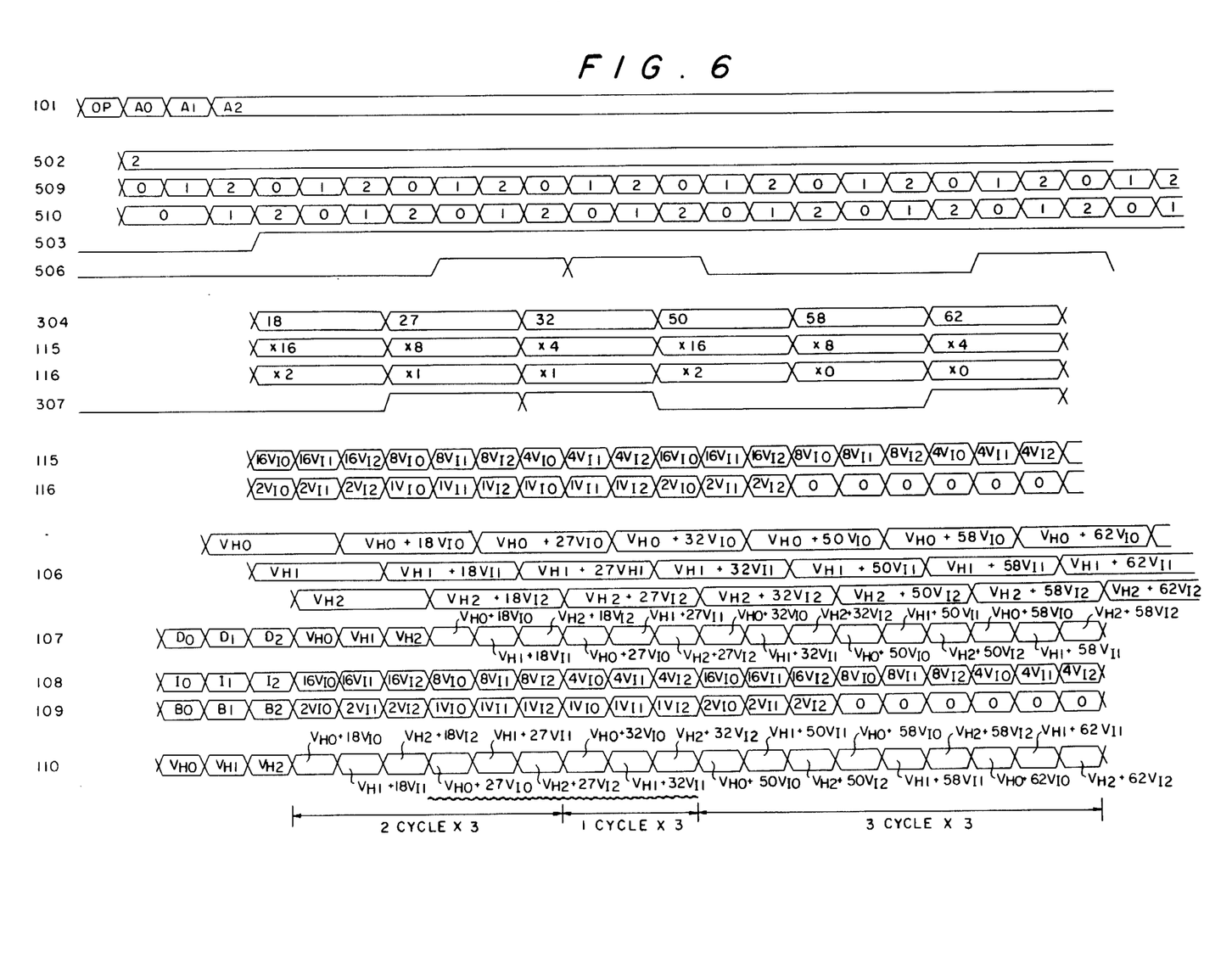
FIG. 6 is a diagram for describing the operation of the embodiment.

Referring to FIG. 6, the $2^n$-multiple-generating circuit A 115 of FIG. 1 selects the shifter having a 4-bit shift left (x 16) function of FIG. 4 according to the value of the select register A 305 shown in FIG. 3, and outputs the result of processing of 16 x the VAI value ($V_I$) of the vector. At the same time, the $2^n$-multiple-generating circuit B 116 shown in FIG. 1 selects the shifter having a 1-bit shift left (x 2) function of FIG. 4 according to the value of the select register A 306 shown in FIG. 3, and outputs the result of processing of 2 x the VAI value ($V_I$) of the vector.

Referring again to FIG. 1, in response to an instruction by the vector-instruction-control circuit 102, the output of the vector address register 106, i.e., the 0th element address ($V_H$) of the vector operand, is selected by the selector 107; the output of the $2^n$-multiple-generating circuit A 115, i.e., 16 x the VAI value ($V_I$) of the vector, is selected by the selector 108, and the output of the $2^n$-multiple-generating circuit B 116, i.e., 2 x the VAI value ($V_I$) of the vector, is selected by the selector 109. These selected values are added by the address adder 110, and the result $V_H + 18V_I$ is output. This result of addition is an intermediate result, and is set in the vector address register 106, where $V_H$ had been set. In this manner, addition is applied to each vector operand.

Now, according to the value of the mask count register 304 shown in FIG. 3, the DPAC 112 shown in FIG. 1 is conducted 18-bit shifting to the left. In response to this output, the CMBC 113 outputs "27"-"18"="9". This output "9", or "001001" in a binary number, passes as it is the logic circuit 301 shown in FIG. 3, because there is no combination prohibiting simultaneous selection in the $2^n$-multiple-generating circuit A 115 or B 116; a value of "27" is set in the register 304; a binary number "0010" is set in the select register A 305, and a binary number "01" is set in the select register B 306. Along with this, the output "1" of the logic circuit 302 is set in the completion-flag F/F 307, and output.

In the $2^n$-multiple-generating circuit A 115, 8 x the VAI value ($V_I$) is obtained as instructed by the output of the select register A 305, while in the $2^n$-multiple-generating circuit B 116 is obtained 1 x the VAI value ($V_I$) as instructed by the output of the select register B 306. From the vector address register 106 is supplied the previous set value $V_H + 18V_I$. The output 8 x $V_I$ of the circuit A 115, the output 1 x $V_I$ of the circuit B 116 and the output $V_H + 18V_I$ of the vector address register 106 are sent to the address adder 116 to be added together. The addition result $V_H + 27V_I$ is set in the vector address register 106 as operand address, and at the same time supplied to the memory control unit 16 as well. This time, however, the difference from the last time is that the read request is "1". The memory read demand, together with the output of the completion-flag F/F 307, is prepared by the vector-instruction-control circuit 102.

Figure 5:
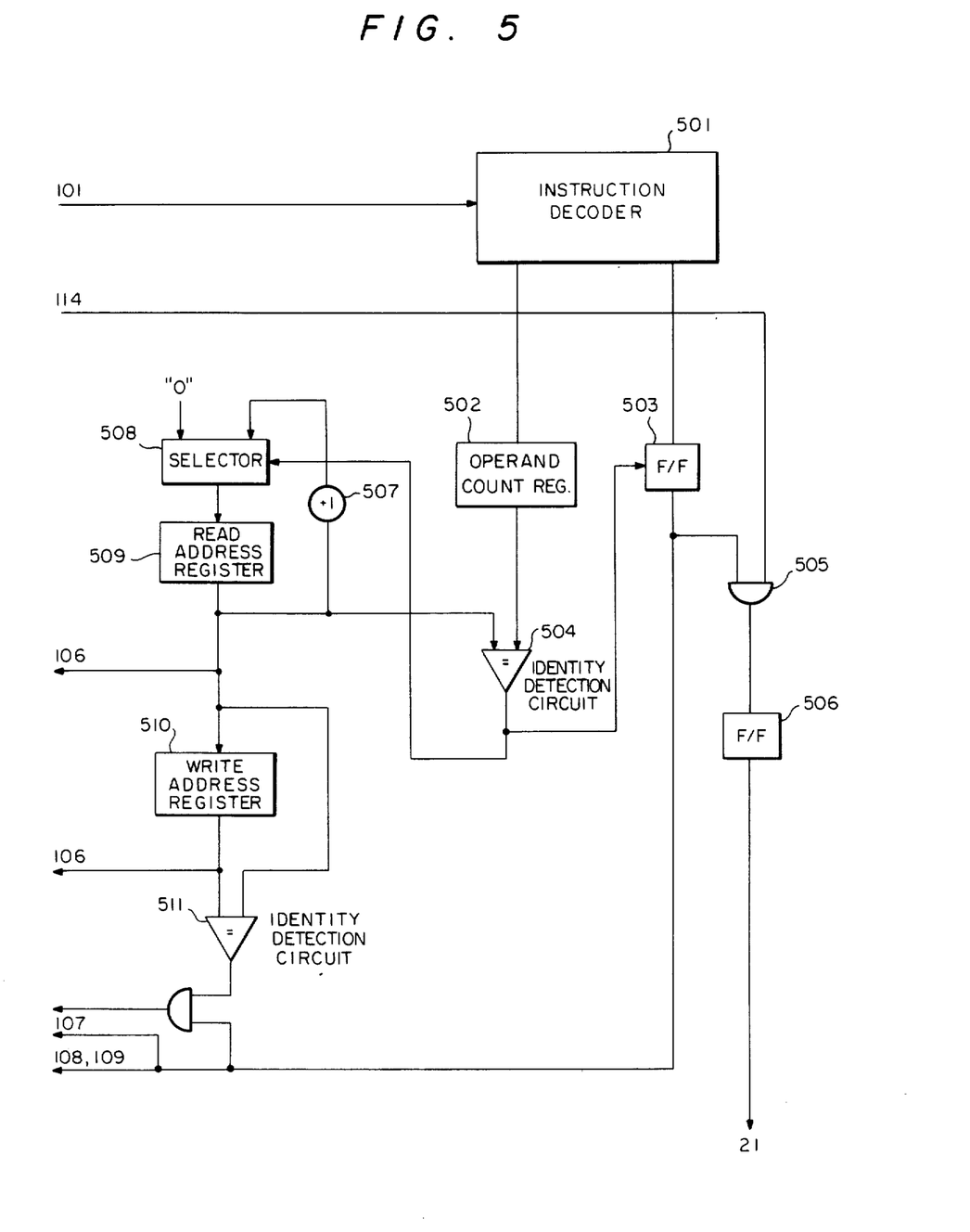
FIG. 5 is a diagram of one example of the structure of a vector-instruction-control circuit 102 shown in FIG. 1.

Referring now to FIG. 5, the vector instruction-control circuit 102 comprises an instruction decoder 501 for decoding OP codes and outputting the number of vector operands and the like; an operand count register 502 for setting the number of operands sent from the decoder 501; a read address register 509 for designating the read register number of the vector address register 106 of FIG. 1, and a write address register 510 for designating the write register number of the vector address register 106. The read address register 509 is counted up from "0", and the write address register 510 is used in response to the value of the read address register 509. If the value of the read address register 509 and the number of vector operands set in the operand count register 502 are found identical with each other by an identity detection circuit 504, a selector 508 will select "0", and "0" will be set in the read address register 509. Along with this, an identity signal from the identity detection circuit 504 is given to a masked-vector-instruction-flag flip-flop (F/F) 503 as set signal. In the F/F 503 is set information resulting from the decoding by the instruction decoder 501 to find out whether or not the instruction in the instruction register 101 shown in FIG. 1 is a masked vector instruction. In response to the output "1" of the F/F 503, the selector A 107, selector B 108 and selector C 109 shown in FIG. 1 select the outputs of the vector address register 106, $2^n$-multiple-generating circuit A 115 and $2^n$-multiple-generating circuit B 116, respectively. As identity between the output of the read address register 509 and that of the write address register 510, both of FIG. 5, is detected by an identity detection circuit 511, the output of the circuit 511 instructs the selection of the output of the address adder 110 in FIG. 1 by the selector A. This is a function to permit continuous address calculation when there is only one vector operand.

The output of the completion flag F/F 307 shown in FIG. 3, in the VMCC 114 shown in FIG. 1, and that of the masked-vector-instruction-flag F/F 503 are put to AND operation, and the logical product is set in a memory-request-flag flip-flop (F/F) 506, whose output is sent, as a memory access request, to the memory control unit 21 in FIG. 2 along with an address. In this manner are achieved address calculations of vector elements whose arithmetic operation is not inhibited, and access to the memory is thereby made possible.

Now, supposing that the number (N) of consecutive mask bits is "30", the operations of the $2^n$-multiple-generating circuits A 115 and B 116, illustrated in FIG. 4, will be described. First in the circuit A 115 is selected a shifter having a 4-bit shift left (x 16) function to generate $2^4V_I$. At the same time, in the circuit B 116 is selected a shifter having a 1-bit shift left (x 2) function to generate $2^1V_I$. The values $2^4V_I$ and $2^1V_I$ and the 0th element address ($V_H$) of the vector operand are added together by the address adder 110 of FIG. 1 to generate the addition result $V_H + 16V_I + 2V_I$. This value is used in the second addition as first intermediate result. Next, in the $2^n$-multiple-generating circuit A 115 illustrated in FIG. 4 is selected a shifter having a 3-bit shift left (x 8) function to generate $2^3V_I$. At the same time in the $2^n$-multiple-generating circuit B 116 is generated "0" because none of its shifters is selected. The values $2^3V_I$ and 0, and the first intermediate result $V_H+16V_I+2V_I$ are added together by the address adder 110 shown in FIG. 1 to generate the addition result $V_H+16V_I+8V_I+2V_I$. This value is used in the third addition as second intermediate result. Then, in the $2^n$-multiple-generating circuit A 115 illustrated in FIG. 4 is selected a shifter having a 2-bit shift left (x 4) function to generate $2^2V_I$. At the same time in the $2^n$-multiple-generating circuit B 116 is generated "0" because none of its shifters is selected. The values $4V_I$ and 0, and the second intermediate result $V_H+16V_I+8V_I+2V_I$ are added together by the address adder 110 shown in FIG. 1 to generate the addition result $V_H+16V_I+8V_I+4V_I+2V_I$. This is equal to $V_H+30V_I$, which is the desired addition result, but it requires three additions to obtain because the $2^n$-multiple-generating circuit B 116 has no shifter having a function to shift by two bits or more.

Next will be described in detail an instance wherein the calculation of $30V_I$, which required three additions with the circuit shown in FIG. 4, can be achieved with two additions.

Figure 8:
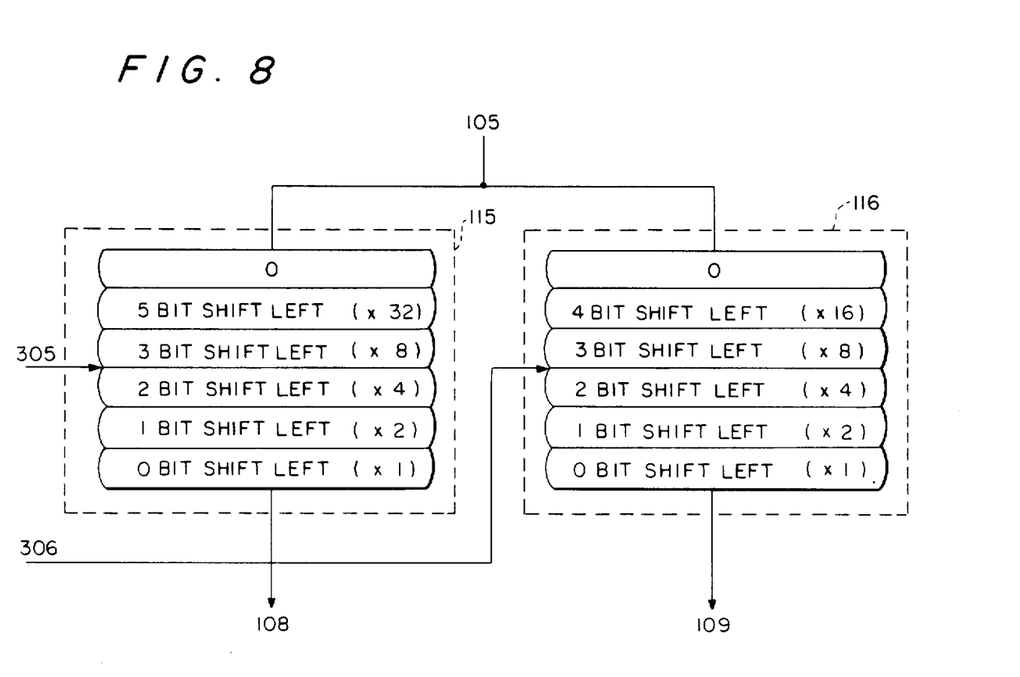
FIG. 8 is a diagram of another example of the structure of $2^n$-multiple-generating circuits 115 and 116 shown in FIG. 1.

Referring to FIG. 8, in another example of the $2^n$-multiple-generating circuit A 115, there can be selected one out of a shifter having a 0-bit shift left (x 1) function, a shifter having a 1-bit shift left (x 2) function, a shifter having a 2-bit shift left (x 4) function, a shifter having a 3-bit shift left (x 8) function and a shifter having a 5-bit shift left (x 32) function, and "0" is outputted when none of them is selected. Meanwhile, in another example of the $2^n$-multiple-generating circuit B 116, there can be selected one out of a shifter having a 0-bit shift left (x 1) function, a shifter having a 1-bit shift left (x 2) function, a shifter having a 2-bit shift left (x 4) function, a shifter having a 3-bit shift left (x 8) function and a shifter having a 4-bit shift left (x 16) function, and "0" is outputted when none of them is selected.

Now will be described below how the number of consecutive mask bits, 30, is calculated by the use of the circuit illustrated in FIG. 8.

First in the $2^n$-multiple-generating circuit A 115 is selected a shifter having a 3-bit shift left (x 8) function to generate $2^3V_I$. At the same time, in the $2^n$-multiple-generating circuit B 116 is selected a shifter having a 4-bit shift left (x 16) function to generte $2^4V_I$. The values $2^3V_I$ and $2^4V_I$ and the 0th element address ($V_H$) of the vector operand are added together by the address adder 110 of FIG. 1 to generate the addition result $V_H+8V_I+16V_I$. This value is used in the second addition as first intermediate result. Next, in the $2^n$-multiple-generating circuit A 115 is selected a shifter having a 2-bit shift left (x 4) function to generate $2^2V_I$. At the same time, in the $2^n$-multiple-generating circuit B 116 is selected a shifter having a 1-bit shift left (x 2) function to generate $2^1V_I$. The values $2^2V_I$ and $2^1V_I$, and the first intermediate result $V_H+16V_I+8V_I$ are added to generate the addition result $V_H+16V_I+8V_I+4V_I+2V_I$. This is equal to $V_H+30V_I$, desired addition result, which the circuit of FIG. 8 requires only two additions to obtain.

The VMCC 114 in FIG. 4 requires, for this manner of shifter selection, the structure illustrated in FIG. 3.

Figure 7:
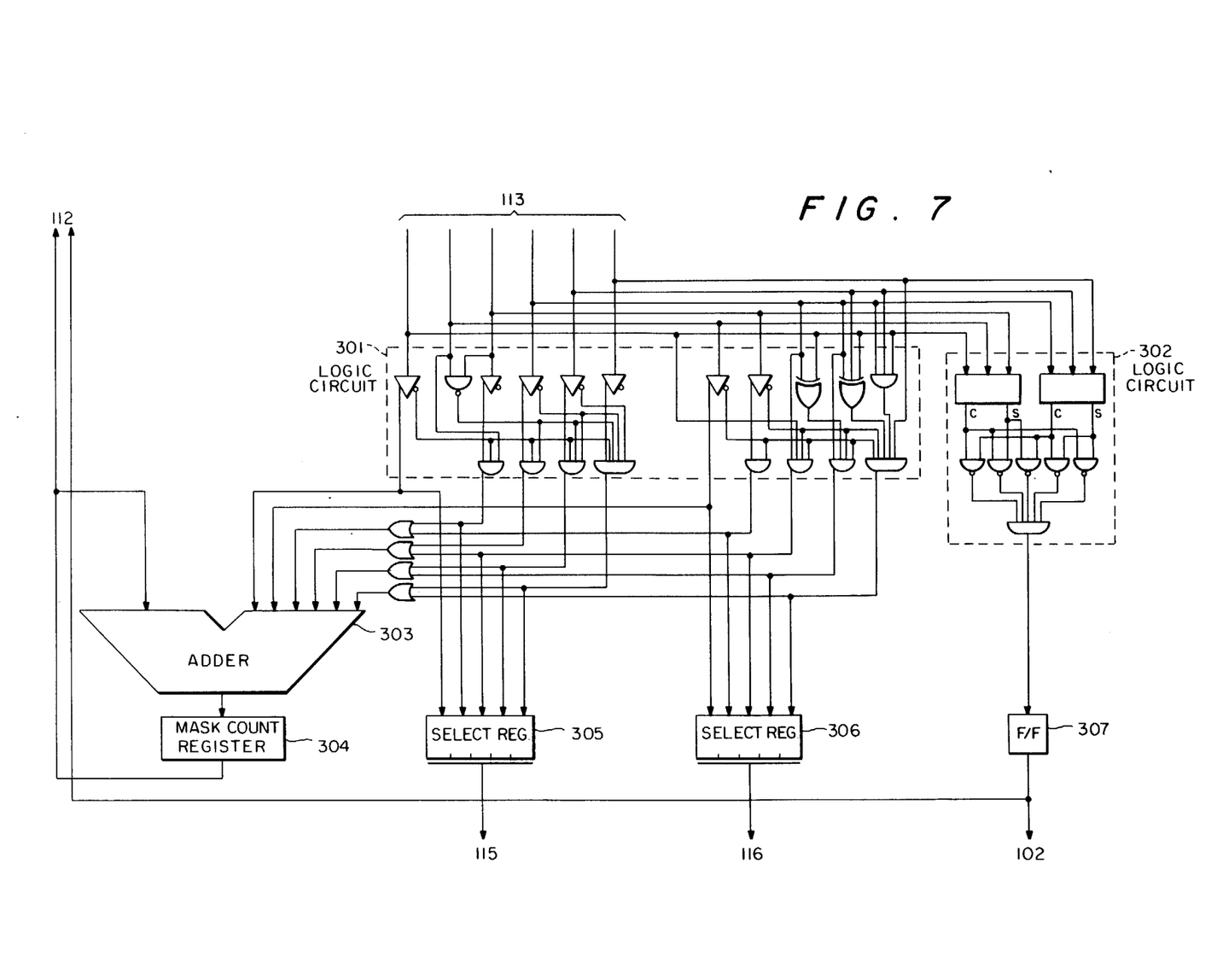
FIG. 7 is a diagram of another example of the structure of a vector-mask-control circuit 114 shown in FIG. 1.

The main difference between the circuit shown in FIG. 3 and that in FIG. 7 lies in the logic circuits 301 and 302. This is because of the difference in sector composition between the $2^n$-multiple-generating circuits A 115 and B116 of FIG. 8 on the one hand and the corresponding circuits of FIG. 4 on the other.

As hitherto described, the present invention can process masked-vector instructions so as not to perform unnecessary reading or arithmetic operation of operands corresponding to mask inhibitory bits by providing a means to generate one or two multiplex of vector address increment values by a power of 2 by the use of counted values. As a result, the efficient processing of masked-vector instructions can be achieved. Additionally, the whole structure becomes simpler because no special multiplier is needed.

What is claimed is:

1. A vector mask operation control unit in a data processing system for executing processing of masked, vector instructions decoded by an instruction control unit comprising:
    counting means for counting consecutive operation-inhibitory bits in a plurality of bits, each operation-inhibitory bit masking one of a plurality of vector operands pointed to by said vector instructions decoded by said instruction unit;
    means for preventing memory access and arithmetic operations on said masked operands comprising:
    (a) increment generating means for generating a total address increment value in response to the count of consecutive operation-inhibitory bits counted by said counter means, said total address increment value being comprised of at least one address increment value multiplied by a power of two; and
    (b) address generating means for obtaining an operand address by adding the total address increment value received from said increment generating means, and a vector address.

2. A vector mask control unit as claimed in claim 1, wherein said increment generating means comprises first and second $2^n$-multiple-generating circuits.

3. A vector mask control unit as claimed in claim 2, wherein said first and second $2^n$-multiple-generating circuits comprise a plurality of shifting means, each shifting means being capable of shifting bits representing a binary number a fixed number of positions to effect a multiplication of the binary number by a power of two.

4. A vector mask control unit as claimed in claim 3, further comprising a logic circuit including means for selecting one of said plurality of shifting means from each of said first and second $2_n$-multiple-generating circuits in response to receiving the number of consecutive operation-inhibitory bits counted by said counting means and means for generating said address increment value in accordance with the output of said selected shifting means.

5. A method of operating a vector mask control unit in a data processing system for processing masked vector instructions decoded by an instruction control unit, said method comprising the steps of:
    (a) counting operation-inhibitory bits in a plurality of bits with a counting means, each operation-inhibitory bit masking one of plural vector operands pointed to by said vector instructions decoded by said instruction unit;

(b) preventing memory access and arithmetic operations on said inhibited vector operands by the further steps of:
  (1) generating a total address increment value by the use of the count of consecutive operation-inhibitory bits counted by said counter means, said total address increment value being comprised of at least one address increment value multiplied by a power of two, and
  (2) adding said total address increment value and a vector address to obtain an operand address.

* * * * *